(12) United States Patent
Okada et al.

(10) Patent No.: US 8,709,655 B2
(45) Date of Patent: Apr. 29, 2014

(54) POSITIVE ELECTRODE ACTIVE MATERIAL FOR NONAQUEOUS ELECTROLYTE SECONDARY BATTERY

(75) Inventors: Shigeto Okada, Fukuoka (JP); Jun-ichi Yamaki, Kasuga (JP); Yusuke Takahashi, Dazaifu (JP); Kenji Nakane, Tsukuba (JP)

(73) Assignees: Sumitomo Chemical Company, Limited, Tokyo (JP); Kyushu University, National University Corporation, Fukuoka (JP)

( * ) Notice: Subject to any disclaimer, the term of this patent is extended or adjusted under 35 U.S.C. 154(b) by 985 days.

(21) Appl. No.: 11/719,417

(22) PCT Filed: Nov. 24, 2005

(86) PCT No.: PCT/JP2005/021596
§ 371 (c)(1),
(2), (4) Date: Jul. 26, 2007

(87) PCT Pub. No.: WO2006/057307
PCT Pub. Date: Jun. 1, 2006

(65) Prior Publication Data
US 2009/0159838 A1    Jun. 25, 2009

(30) Foreign Application Priority Data
Nov. 26, 2004   (JP) .................................. 2004-341866

(51) Int. Cl.
*H01M 4/00*  (2006.01)
*H01M 4/48*  (2010.01)
*C01D 1/02*  (2006.01)

(52) U.S. Cl.
USPC ...................... 429/221; 429/231.1; 423/594.2

(58) Field of Classification Search
USPC ............................. 429/221, 231.1; 423/594.2
See application file for complete search history.

(56) References Cited

U.S. PATENT DOCUMENTS

2007/0212605 A1 * 9/2007 Yamaki et al. ................ 429/221

FOREIGN PATENT DOCUMENTS

| EP | 0 672 622 A1 | 9/1995 | |
|---|---|---|---|
| JP | 3-291864 A | 12/1991 | |
| JP | 3291863 | 12/1991 | |
| JP | 11-040156 | 2/1999 | |
| JP | 11040156 | * 2/1999 | |
| JP | 11-317226 A | 11/1999 | |
| JP | 2001-146430 A | 5/2001 | |
| JP | 2001-332258 A | 11/2001 | |
| JP | 2003-012327 A | 1/2003 | |
| JP | 2003-151549 A | 5/2003 | |
| JP | 2004-323331 | * 11/2004 | ............. C01G 53/00 |
| JP | 2004-323331 A | 11/2004 | |
| JP | 2005317511 | 11/2005 | |

OTHER PUBLICATIONS

Y. Shin, et al, "Preparation and structural properties of layer-type oxides $Na_xNi_{x/2}Ti_{1-x/2}O_2$ (0.60 ≤ x ≤ 1.0)", Solid State Ionics, vol. 132, (2000), pp. 131-141.
Taiwanese Office Action dated Mar. 19, 2012 issued in corresponding Taiwanese Patent Application No. 10120251470.
S. Uchida et al. "Formation of $Na_xFeO_2$ by the oxidation of iron powder in concentrated sodium hydroxide solutions at elevated temperatures", Journal of Materials Science Letters, vol. 14 (1995), p. 633.
European Office Action issued in European Application No. 05809404.6 dated Sep. 24, 2013.
Tsuda et al., "Li-Ni-Ti oxide as a novel compound; synthesis and electrode performance", reported The 44th Battery Symposium in Japan Proceedings, Nov. 4-6, 2003, pp. 356-357.
Takahashi et al., "Layered transition metal oxide as cathodes for sodium secondary battery", reported in The 45th Battery Symposium in Japan, Nov. 27-29, 2004, pp. 268-269.

* cited by examiner

*Primary Examiner* — Ling-Siu Choi
*Assistant Examiner* — Monique Peets
(74) *Attorney, Agent, or Firm* — Sughrue Mion, PLLC

(57) ABSTRACT

Disclosed is a positive electrode active material for nonaqueous electrolyte secondary batteries which contains a complex oxide mainly containing sodium, nickel and a tetravalent metal while having a hexagonal structure. This positive electrode active material enables to obtain a nonaqueous electrolyte secondary battery with high operating voltage. The complex oxide is preferably expressed as $Na[Na_{(1/3-2x/3)}Ni_{(x-y)}M_{(2/3-x/3-y)}A_{2y}]O_2$ (wherein M represents one or more tetravalent metals, A represents one or more trivalent metals, $0 < x \leq 0.5$, $0 \leq y < 1/6$, and $x > y$).

9 Claims, 5 Drawing Sheets

POSITIVE ELECTRODE ACTIVE MATERIAL FOR NONAQUEOUS ELECTROLYTE SECONDARY BATTERY

TECHNICAL FIELD

The present invention relates to a positive electrode active material for non-aqueous electrolyte secondary batteries.

BACKGROUND ART

Non-aqueous electrolyte lithium secondary batteries have been put to practical use as secondary batteries for portable electronic equipments and are widely used. However, $LiCoO_2$ used as the positive electrode active material is a compound of Li and Co which is less in the deposit amount as resources and are expensive, and there is demanded a positive electrode active material for non-aqueous electrolyte secondary batteries which comprises a compound containing mainly those elements which are abundant in resources.

Under the circumstances, $NaNiO_2$ which is a composite oxide of sodium and nickel which are abundant in resources has been proposed as a positive electrode active material for non-aqueous electrolyte secondary batteries (cf. Non-patent Document 1).

However, non-aqueous electrolyte secondary batteries using $NaNiO_2$ as a positive electrode active material suffer from the problem that the operating voltage is low, namely, about 2.0 V (cf. Patent Document 1).

Non-Patent Document 1: Solid State Ionics, Elsevier Science, 2000, Vol. 132, p. 131-141

Patent Document 1: JP-A-2003-151549

DISCLOSURE OF INVENTION

Problem to be Solved by the Invention

The object of the present invention is to provide a positive electrode active material for non-aqueous electrolyte secondary batteries which gives non-aqueous electrolyte secondary batteries having a high operating voltage and contains mainly sodium and nickel.

Means for Solving the Problem

As a result of an intensive research conducted by the inventors on positive electrode active materials for non-aqueous electrolyte secondary batteries which contain mainly sodium and nickel, it has been found that non-aqueous electrolyte secondary batteries having high operating voltage can be obtained by using a composite oxide having a hexagonal crystal structure and containing sodium, nickel and a tetravalent metal as a positive electrode active material for non-aqueous electrolyte secondary batteries. It has been further found that the positive electrode active material can be obtained by firing a metal compound mixture containing a sodium compound, a nickel compound and a compound of a tetravalent metal in an inert atmosphere. Thus, the present invention has been accomplished.

That is, the present invention provides a positive electrode active material for non-aqueous electrolyte secondary batteries which is characterized by comprising a composite oxide mainly containing sodium, nickel and a tetravalent metal and having a hexagonal crystal structure. Furthermore, the present invention provides a method for producing a positive electrode active material for non-aqueous electrolyte secondary batteries, characterized by firing a metal compound mixture containing a sodium compound, a nickel compound and a tetravalent metal compound in an inert atmosphere.

Advantage of the Invention

The positive electrode active material for non-aqueous electrolyte secondary batteries according to the present invention gives non-aqueous electrolyte secondary batteries which are high in operating voltage and excellent in characteristics as secondary batteries, and according to the method of the present invention, the positive electrode active material for non-aqueous electrolyte secondary batteries of the present invention can be produced. Thus, the present invention is industrially very useful.

BEST MODE FOR CARRYING OUT THE INVENTION

The positive electrode active material for non-aqueous electrolyte secondary batteries of the present invention comprises a composite oxide mainly containing sodium, nickel and a tetravalent metal.

As the composite oxide, mention may be made of a compound represented by the formula (1):

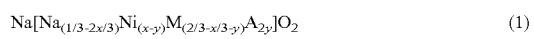

$$Na[Na_{(1/3-2x/3)}Ni_{(x-y)}M_{(2/3-x/3-y)}A_{2y}]O_2 \quad (1)$$

(in the above formula, M represents one or more tetravalent metals, A represents one or more trivalent metals, and x>y). The compositional proportions of Na, Ni, M and A in the formula (1) means a mixing proportion of them in the starting materials.

Examples of M which is a tetravalent metal include one or more metals selected from the group consisting of Si, Pb, Zr, Hf, V, Nb, Ta, Re, Ge, Er, Ti, Mn, Sn, Ce, Pr and Tb, and, among them, one or more metals selected from the group consisting of Ti, Mn and Sn which are abundant in reserves as resources are especially preferred. Examples of A which is a trivalent metal include one or more metals selected from the group consisting of Al, Ga, In, Tl, Co, Rh, Sc, V, Cr, Fe, Y, Nb, Mo, Ru, Sb, La, Ce, Pr, Nd, Sm, Eu, Gd, Tb, Dy, Ho, Er, Tm, Yb, Lu, Ta, Re, Os, Ir, Au, Bi, Ac and Np, and, among them, one or more metals selected from the group consisting of Al, Ga, Co, V, Y and La are especially preferred because the discharge voltage tends to increase. The above V, Nb, Ta, Re, Ce, Pr, Tb and Er can have valences of trivalence and/or tetravalence. Whether they take trivalence or tetravalence is determined by examining the state of valence of the produced composite oxide by XPS (X-ray photo-electron spectroscopy) or ESR (electron-spin resonance). When two or more metals are used as M or A, the total of the compositional proportions of the respective metals satisfy the formula (1). For example, when the two of Ti and Mn are used as the tetravalent metals and the compositional proportions of them are a and b, respectively, the total of a+b satisfies the above formula.

The value x can be selected in the range of $0<x\leq0.5$ at which the hexagonal crystal structure is maintained, and the range of $0.4\leq x\leq0.5$ is preferred because the discharge capacity tends to increase. The value y is preferably in the range of $0\leq y<1/6$. Furthermore, sodium, nickel and the tetravalent metal atom may be substituted with Li, K, Ag, Mg, Ca, Sr, Ba, B, Al, Ga, In, Cr, Fe, Cu, Zn, Sc, Y, Nb, Mo, La, Ce, Pr, Nd, Sm, Eu, Gd, Tb, Ho, Er, Tm, Yb, Lu, etc. in the range of not more than 50 mol % of each site. However, it is preferred that they are substantially not contained because in this case, the positive electrode active material tends to give a non-aqueous electrolyte secondary battery having a high operating voltage.

Moreover, so long as the resulting compound does not change in its crystal structure and is identified to be a compound represented by the formula (1) in X-ray diffraction, oxygen may also be substituted with a halogen, sulfur or nitrogen in the range of not more than 5 mol %, but it is preferred that they are substantially not contained because the resulting positive electrode active material tends to provide a non-aqueous electrolyte secondary battery having a high operating voltage.

The composite compound in the present invention has a hexagonal crystal structure. Therefore, it has the XRD peak corresponding to an interplanar spacing of 2.20 Å and the XRD peak corresponding to an interplanar spacing of 5.36 Å in X-ray diffraction analysis. These XRD peaks corresponding to the interplanar spacing of 2.20 Å and the interplanar spacing of 5.36 Å correspond to the XRD peaks at (104) plane and (003) plane of $\alpha$-NaFeO$_2$ type structure, respectively. However, this interplanar spacing of crystal lattice has some variation depending on metallic elements other than Na, Ni and the tetravalent metallic element contained in the composite oxide and on the production method, and since the XRD peak at 2.20 Å has a variation in the width of ±0.02 Å, the interplanar spacing is 2.20±0.02 Å, and since the XRD peak at 5.36 Å has a variation of ±0.04 Å, the interplanar spacing is 5.36±0.04 Å. When the value r obtained by dividing the intensity of the XRD peak corresponding to the interplanar spacing of 2.20 Å by the intensity of the XRD peak corresponding to the interplanar spacing of 5.36 Å is 1.3 or more, the positive electrode active material of the present invention tends to give a non-aqueous electrolyte secondary battery having higher operating voltage, and such positive electrode active material comprising the above composite oxide is preferred. When the value r obtained by dividing the intensity of the XRD peak corresponding to the interplanar spacing of 2.20 Å by the intensity of the XRD peak corresponding to the interplanar spacing of 5.36 Å is 5.0 or less, the hexagonal layer structure becomes firm, which is preferred, and the value r is more preferably 3.0 or less.

Furthermore, the composite oxide in the present invention sometimes has a orthorhombic crystal structure. This orthorhombic crystal has the XRD peak corresponding to an interplanar spacing of 2.09 Å in the X-ray diffraction analysis. This interplanar spacing of crystal lattice has some variation depending on metallic elements other than Na, Ni and the tetravalent metallic element contained in the composite oxide and on the production method, and since the XRD peak of 2.09 Å has a variation in the width of ±0.02 Å, the interplanar spacing is 2.09±0.02 Å. In the composite oxide of the present invention, the value s obtained by dividing the intensity of the XRD peak corresponding to the interplanar spacing of 2.09 Å by the intensity of the XRD peak corresponding to the interplanar spacing of 2.20 Å is preferably 1 or less, more preferably 0.3 or less, further preferably 0.05 or less. When the value s is in the above range, the charge and discharge capacity of the non-aqueous electrolyte secondary battery can be further increased.

Next, the method for production according to the present invention will be explained.

The method of the present invention is characterized by firing a metal compound mixture containing a sodium compound, a nickel compound and a tetravalent metal compound in an inert atmosphere.

As the sodium compound, nickel compound and compound of M in the formula (1), there may be used oxide, hydroxide, carbonate, nitrate, sulfate, acetate, oxalate, halides, etc. The sodium compound is especially preferably Na$_2$CO$_3$ and Na$_2$O$_2$, the nickel compound is especially preferably Ni(OH)$_2$, the manganese compound is especially preferably MnO$_2$, the titanium compound is especially preferably TiO$_2$, and the tin compound is especially preferably SnO, SnO$_2$ and H$_2$SnO$_3$.

The metal compound mixture containing a sodium compound, a nickel compound and a tetravalent metal compound can be obtained by weighing the metal compounds at a given molar ratio and mixing them by dry or wet mixing. The dry mixing is simple and preferred, and can be carried out using an apparatus such as agate mortar, rotary agitator, V type mixer, W type mixer, ribbon blender, drum mixer, ball mill, or the like.

The positive electrode active material of the present invention can be obtained by firing the resulting metal compound mixture, but it is necessary to carry out the firing in an inert atmosphere. As the inert atmosphere, specifically there may be used argon, helium, neon, nitrogen, carbon dioxide, etc., and argon and nitrogen are preferred. The inert atmosphere may contain not more than about 1 vol % of oxygen or hydrogen, but if water vapor is contained in a large amount, irreversible capacity of the non-aqueous electrolyte secondary battery given by the resulting positive electrode active material tends to increase, and dew point of the inert atmosphere in the method of the present invention is preferably 0° C. or lower.

The firing temperature is in the range of preferably 900° C. or higher and 1200° C. or lower, more preferably 950° C. or higher and 1150° C. or lower, and the retention time in this temperature range is usually from 1 hour to 80 hours. The mixture may be compression molded into a pellet before heating.

In the production method of the present invention, prefiring may be carried out before firing. The pre-firing temperature is in the range of preferably 600° C. or higher and 800° C. or lower, more preferably 650° C. or higher and 750° C. or lower, and the retention time in this temperature range is usually from 1 hour to 30 hours. The atmosphere for the pre-firing is preferably an inert atmosphere.

The furnace used for firing must be such that the atmosphere therein is replaceable. It is preferred that vacuum replacement (an operation of removing the atmosphere in the furnace using a vacuum pump and thereafter introducing a given gas into the furnace) can be performed, but the furnace may be such type as the gas of atmosphere being able to efficiently flow therethrough, such as, for example, a tubular furnace.

After firing, the resulting compound can be adjusted to a given particle size by industrially common methods such as vibration mill, jet mill, dry ball mill, and the like.

Next, a non-aqueous electrolyte sodium secondary battery having the positive electrode active material of the present invention will be explained.

When a non-aqueous electrolyte sodium secondary battery is made using the positive electrode active material of the present invention discovered by the inventors, surprisingly the resulting non-aqueous electrolyte sodium secondary battery has high characteristics that the operating voltage is high and the discharge voltage does not rapidly decrease with progress of discharging.

First, the positive electrode of the non-aqueous electrolyte sodium secondary battery of the present invention having the positive electrode active material of the present invention can be produced by supporting on a positive electrode current collector a positive electrode mix comprising the positive electrode active material of the present invention and furthermore a carbonaceous material as a conductive material, a binder, and the like. The carbonaceous material includes, for example, natural graphite, artificial graphite, cokes, and carbon black. As the conductive material, they may be used each alone or as a mixture of, for example, artificial graphite and carbon black.

As the binder, thermoplastic resins are ordinarily used, and examples thereof are polyvinylidene fluoride (hereinafter sometimes referred to as "PVDF"), polytetrafluoroethylene (hereinafter sometimes referred to as "PTFE"), ethylene tetrafluoride-propylene hexafluoride-vinylidene fluoride copolymers, propylene hexafluoride-vinylidene fluoride copolymers, ethylene tetrafluoride-perfluorovinyl ether copolymers, etc. These may be used each alone or in admixture of two or more.

As the positive electrode current collector, there may be used Al, Ni, stainless steel, etc., and Al is preferred because Al can be easily worked to a thin film and is inexpensive. The positive electrode mix can be supported on the positive electrode current collector by a method of press molding, and a method of preparing a paste of the mix using a solvent, coating the paste on the positive electrode current collector, followed by drying and pressing to fix the coat on the current collector. If necessary, an active material other than the active material of the present invention may be contained in the positive electrode.

Next, as a negative electrode of the non-aqueous electrolyte sodium secondary battery of the present invention, there may be used, for example, sodium metal, sodium alloys, or materials which can be subjected to doping/dedoping of sodium ion. As the materials which can be subjected to doping/dedoping of sodium ion, mention may be made of carbonaceous materials, chalcogen compounds such as oxides and sulfides which can be subjected to doping/dedoping of sodium ion under a potential lower than that of the positive electrode, borates, etc.

If necessary, thermoplastic resins can be added to the negative electrode as a binder. The thermoplastic resins include, for example, PVDF, polyethylene, polypropylene, etc.

As the negative electrode current collector, Cu, Ni, stainless steel, etc. can be used, and Cu is particularly preferred because it hardly produces alloys with sodium and it can be easily worked to a thin film. For supporting a mix containing the negative electrode active material on the negative electrode current collector, there may be used a method of pressure molding or a method of preparing a paste using a solvent and coating the paste on the negative electrode current collector, followed by drying and pressing to fix the coat on the current collector.

As the separators used in the non-aqueous electrolyte sodium secondary battery of the present invention, there may be used, for example, materials in the form of porous film, nonwoven fabric and woven fabric which comprise polyolefin resins such as polyethylene and polypropylene, fluorocarbon resins, nylons, aromatic aramids, etc. The thickness of the separators is usually about 10-200 μm.

Next, as the solvents used for the non-aqueous electrolytes used in the non-aqueous electrolyte sodium secondary battery of the present invention, there may be used, for example, carbonates such as propylene carbonate, ethylene carbonate, vinylene carbonate, dimethyl carbonate, diethyl carbonate, ethylmethyl carbonate, 4-trifluoromethyl-1,3-dioxolan-2-one and 1,2-di(methoxycarbonyloxy)-ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulforan, dimethyl sulfoxide, 1,3-propanesultone, ethylene sulfite, propylene sulfite, dimethyl sulfite and diethyl sulfite, and the above organic solvents into which fluorine substituent is further introduced. Generally, they are used in admixture of two or more. Of these solvents, mixed solvents containing carbonates are preferred, and mixed solvents of cyclic carbonates and non-cyclic carbonates or mixed solvents of cyclic carbonates and ethers are more preferred.

As the mixed solvents of cyclic carbonates and non-cyclic carbonates, mixed solvent containing ethylene carbonate, dimethyl carbonate and ethylmethyl carbonate are preferred because they provide a wide range of operating temperature and are excellent in load characteristics. As the solutes, there are used, for example, $NaClO_4$, $NaPF_6$, $NaBF_4$, $NaCF_3SO_3$, $NaN(CF_3SO_2)_2$, $NaN(C_2F_5SO_2)_2$, and $NaC(CF_3SO_2)_3$. The mixing ratio of solvent and solute is not particularly limited, and may be optionally set depending on the purpose.

A solid electrolyte may be used as the non-aqueous electrolyte, and as the solid electrolyte, there can be used electrolytes comprising, for example, polymeric compounds of polyethylene oxide type and polymeric compounds containing at least one of polyorganosiloxane chains or polyoxyalkylene chains. Moreover, polymers in which non-aqueous electrolyte solution is held, namely, so-called gel type electrolytes, can also be used. When electrolytes comprising inorganic compounds are used, safety can sometimes be enhanced.

The shape of the non-aqueous secondary battery of the present invention is not particularly limited, and may be any of paper type, coin type, cylindrical type, rectangular type, etc.

The outer case of the battery may not be a metallic hard case which also serves as a terminal of negative electrode or positive electrode, and there may be used a bag-like package comprising a laminate sheet containing aluminum, or the like.

The non-aqueous electrolyte sodium secondary battery produced using the positive electrode active material of the present invention as mentioned above has a high operating voltage and is free from the rapid reduction of discharge voltage with progress of discharging and shows a long discharge plateau part. The discharge plateau part means the portion of a discharge curve in which the discharge voltage does not greatly change with progress of discharging after beginning of reduction of voltage in the initial stage of discharging after starting of discharging. The longer the discharge plateau part, the greater the charge and discharge capacity of the non-aqueous electrolyte secondary battery.

The discharge voltage in the discharge plateau part is a voltage in the case of discharging at a current density of 0.1 $mA/cm^2$ or lower based on the area of the positive electrode (the voltage may be measured to be lower when the current density is too high), and can be measured, for example, under the following conditions.

Electrolyte: a solution prepared by dissolving $NaClO_4$ in propylene carbonate (hereinafter sometimes referred to as "PC") to give a concentration of 1 mol/liter (hereinafter sometimes referred to as "1M $NaClO_4$/PC").

Negative electrode: Metallic sodium

Discharge current density: 0.1 $mA/cm^2$

This discharge voltage in the discharge plateau part is 2.5 V or higher in the non-aqueous electrolyte sodium secondary battery produced using the positive electrode active material of the present invention.

EXAMPLE

The present invention will be explained in more detail by the following examples, which should not be construed as limiting the invention in any manner.

Production of electrode and test battery for charge and discharge test and measurement of powder X-ray diffraction were carried out by the following methods unless otherwise notified.

(1) Production of Test Battery for Charge and Discharge Test

The positive electrode active material, acetylene black (50% pressed product manufactured by Denki Kagaku Kogyo Kabushiki Kaisha) as a conductive material, and PTFE (Polyflon TFE F-201L (trade name) manufactured by Daikin Industries. Ltd.) as a binder are weighed so as to give a composition of active material:conductive material:binder=70:25:5 (weight ratio). First, the active material and the conductive material are mixed well by an agate mortar and then the binder is added to the mixture, followed by uniformly mixing them. The resulting mixture is molded to a square with a uniform thickness, and the molded square is bored by a cork borer of 1.5 cm in diameter to obtain a circular pellet. The pellet is put on a titanium expanded metal which is a positive electrode current collector, and they are lightly pressed by an agate pestle and then sufficiently contact bonded by a hand press to obtain a positive electrode pellet.

The positive electrode pellet is placed with the titanium mesh facing downward in a dent of bottom part of HS battery (manufactured by Hohsen Corporation), and a test battery (sodium secondary battery) is produced using in combination a 1 M $NaClO_4$/PC (having a conductivity of 5.42 mS/cm and manufactured by Tomiyama Pure Chemical Industries. Ltd.) as an electrolyte, a separator comprising two polypropylene porous films (CELGARD 3501 (trade name) manufactured by Celgard K.K.) between which is interposed a glass filter (GA-100 (trade name) manufactured by Toyo Roshi Kaisha, Ltd.), and a negative electrode comprising metallic sodium (manufactured by Wako Pure Chemical Industries, Ltd.). The test battery is assembled in a glove box of argon atmosphere.

(2) Measurement of Powder X-ray Diffraction

The measurement is conducted under the following conditions using model RINT2100HLR/PC manufactured by Rigaku Corporation.

X-ray: CuKα
Voltage–current: 50 kV–300 mA
Measuring angle range: 2θ=10-80°
Step: 0.01°
Scan speed: 2°/min

Example 1

(1) Synthesis of Positive Electrode Active Material $Na_2CO_3$, $Ni(OH)_2$ and $TiO_2$ were weighed so that Na, Ni and Ti were at a stoichiometric ratio of $NaNi_{0.5}Ti_{0.5}O_2$, and then they were mixed well by an agate mortar. The resulting mixture was kept at 700° C. for 12 hours in an argon atmosphere to carry out pre-firing, and thereafter the mixture was kept at 950° C. for 36 hours to carry out firing to obtain a positive electrode active material A1 for non-aqueous electrolyte secondary battery. A1 was subjected to powder X-ray diffraction, and the results of the measurement is shown in FIG. 1. A1 had a hexagonal crystal structure and the value obtained by dividing the XRD peak intensity of an interplanar spacing of 2.20 Å by the XRD peak intensity of an interplanar spacing of 5.36 Å was 1.5. The value obtained by dividing the XRD peak intensity of an interplanar spacing of 2.09 Å by the XRD peak intensity of the interplanar spacing of 2.20 Å was 0.03.

(2) Evaluation of Charge and Discharge Performance when A1 was Used as a Positive Electrode Active Material of Sodium Secondary Battery A test battery was produced using A1 and was subjected to constant current charge and discharge test under the following conditions.

Current density: 0.2 mA/cm$^2$
Range of scanning potential: 1.5 V-3.6 V

The resulting charge and discharge curves at the first cycle and the second cycle are shown in FIG. 2. A discharge plateau part of 3 V (vs. Na/Na$^+$) was recognized.

Example 2

The same test battery as of Example 1 was produced using A1 obtained in Example 1 and was subjected to constant current charge and discharge test under the following conditions.

Current density: 0.2 mA/cm$^2$
Range of scanning potential: 1.5 V-4.0 V

The resulting charge and discharge curves at the first cycle and the second cycle are shown in FIG. 3.

Example 3

The same test battery as of Example 1 was produced using A1 obtained in Example 1 and was subjected to constant current charge and discharge test under the following conditions.

Current density: 0.2 mA/cm$^2$
Range of scanning potential: 1.5 V-4.2 V

The resulting charge and discharge curves at the first cycle and the second cycle are shown in FIG. 4.

Example 4

The same test battery as of Example 1 was produced using A1 obtained in Example 1 and was subjected to constant current charge and discharge test under the following conditions.

Current density: 0.2 mA/cm$^2$
Range of scanning potential: 1.5 V-4.5 V

The resulting charge and discharge curve at the first cycle is shown in FIG. 5.

The charge and discharge efficiencies in the case of changing the initial charging cut-off voltage to 3.6, 3.7, 3.8, 4.0, 4.2 and 4.5 V are plotted in FIG. 6 with the initial charge capacity being shown by X-axis and the initial discharge capacity being shown by Y-axis. As a result, reduction of the charge and discharge performance caused by oxidative decomposition of the electrolyte began to be conspicuous at about 3.8 V, and it is clear that in this 1M $NaClO_4$/PC electrolyte system, good cycle characteristics of the positive electrode active material A1 for sodium secondary battery are obtained at 3.8 V or lower.

Example 5

(1) Synthesis of Positive Electrode Active Material $Na_2CO_3$, $Ni(OH)_2$, $TiO_2$ and $MnO_2$ were weighed so that Na, Ni, Ti and Mn were at a stoichiometric ratio of $NaNi_{0.5}Ti_{0.375}Mn_{0.125}O_2$ and then they were mixed well by an agate mortar. The resulting mixture was kept at 700° C. for 12 hours in an argon atmosphere to carry out pre-firing, and thereafter the mixture was kept at 950° C. for 36 hours to carry out firing to obtain a positive electrode active material A2 for non-aqueous electrolyte secondary battery. A2 was subjected to powder X-ray diffraction, and the results of the measurement is shown in FIG. 7. A2 had a hexagonal crystal structure, and the value obtained by dividing the XRD peak intensity of an interplanar spacing of 2.20 Å by the XRD peak intensity of an interplanar spacing of 5.36 Å was 1.4. The value obtained by dividing the XRD peak intensity of an interplanar spacing of 2.09 Å by the XRD peak intensity of the interplanar spacing of 2.20 Å was 0.1.

(2) Evaluation of Charge and Discharge Performance when A2 was Used as a Positive Electrode Active Material of Sodium Secondary Battery A test battery was produced using A2 and was subjected to a constant current charge and discharge test under the following conditions.

Current density: 0.2 mA/cm$^2$
Range of scanning potential: 1.5 V-3.8 V

It is seen that the charge and discharge capacity was smaller than that in the case of using A1.

Example 6

(1) Synthesis of Positive Electrode Active Material $Na_2CO_3$, $Ni(OH)_2$, $TiO_2$ and $MnO_2$ were weighed so that Na, Ni, Ti and Mn were at a stoichiometric ratio of $NaNi_{0.5}Ti_{0.25}Mn_{0.25}O_2$ and then they were mixed well by an agate mortar. The resulting mixture was kept at 700° C. for 12 hours in an argon atmosphere to carry out pre-firing, and thereafter the mixture was kept at 950° C. for 36 hours to carry out firing to obtain a positive electrode active material A3 for non-aqueous electrolyte secondary battery. A3 was subjected to powder X-ray diffraction, and the results of the measurement is shown in FIG. 8. A3 had a hexagonal crystal structure, and the value obtained by dividing the XRD peak intensity of an interplanar spacing of 2.20 Å by the XRD peak intensity of an interplanar spacing of 5.36 Å was 1.3. The value obtained by dividing the XRD peak intensity of an interplanar spacing of 2.09 Å by the XRD peak intensity of the interplanar spacing of 2.20 Å was 0.4.

(2) Evaluation of Charge and Discharge Performance when A3 was Used as a Positive Electrode Active Material of Sodium Secondary Battery A test battery was produced using A3 and was subjected to a constant current charge and discharge test under the following conditions.

Current density: 0.2 mA/cm$^2$
Range of scanning potential: 1.5 V-3.8 V

It can be seen that the charge and discharge capacity was smaller than that in the case of using A2.

Example 7

(1) Synthesis of Positive Electrode Active Material $Na_2CO_3$, $Ni(OH)_2$, $TiO_2$ and $MnO_2$ were weighed so that Na, Ni, Ti and Mn were at a stoichiometric ratio of $NaNi_{0.5}Ti_{0.125}Mn_{0.375}O_2$ and then they were mixed well by an agate mortar. The resulting mixture was kept at 700° C. for 12 hours in an argon atmosphere to carry out pre-firing, and thereafter the mixture was kept at 950° C. for 36 hours to carry out firing to obtain a positive electrode active material A4 for non-aqueous electrolyte secondary battery. A4 was subjected to powder X-ray diffraction, and the results of the measurement is shown in FIG. 9. A4 had a hexagonal crystal structure, and the value obtained by dividing the XRD peak intensity of an interplanar spacing of 2.20 Å by the XRD peak intensity of an interplanar spacing of 5.36 Å was 0.97. The value obtained by dividing the XRD peak intensity of an interplanar spacing of 2.09 Å by the XRD peak intensity of the interplanar spacing of 2.20 Å was 1.5.

(2) Evaluation of Charge and Discharge Performance when A4 was Used as a Positive Electrode Active Material of Sodium Secondary Battery A test battery was produced using A4 and was subjected to a constant current charge and discharge test under the following conditions.

Current density: 0.2 mA/cm$^2$
Range of scanning potential: 1.5 V-3.8 V

It can be seen that the discharge capacity was smaller than that in the case of using A3.

Industrial Applicability

When the positive electrode active material of the present invention is used, there can be produced a non-aqueous electrolyte secondary battery high in operating voltage and excellent in characteristics as a secondary battery, and hence the present invention is industrially very useful.

Figure 1:
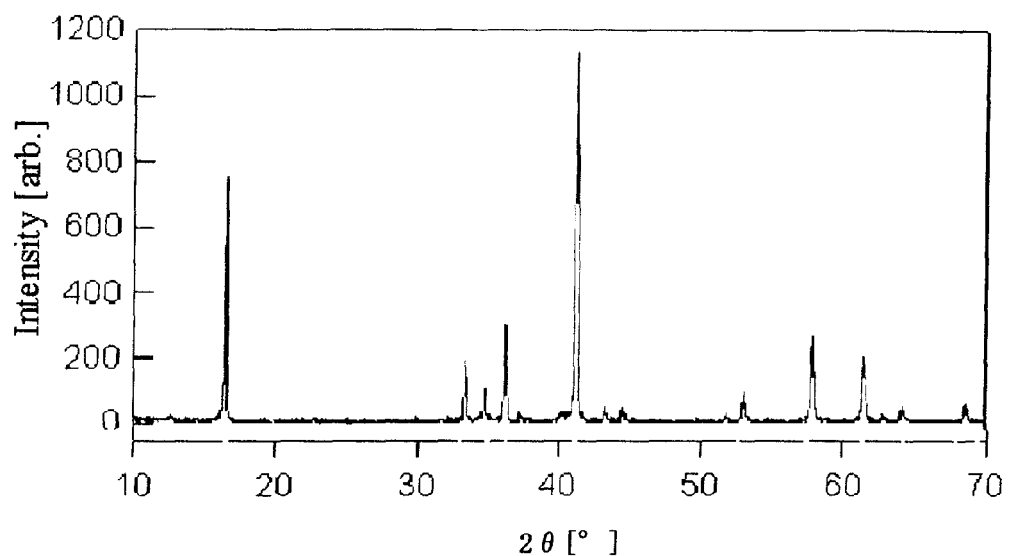
FIG. 1 shows the results of measurement of powder X-ray diffraction in Example 1.
Figure 2:
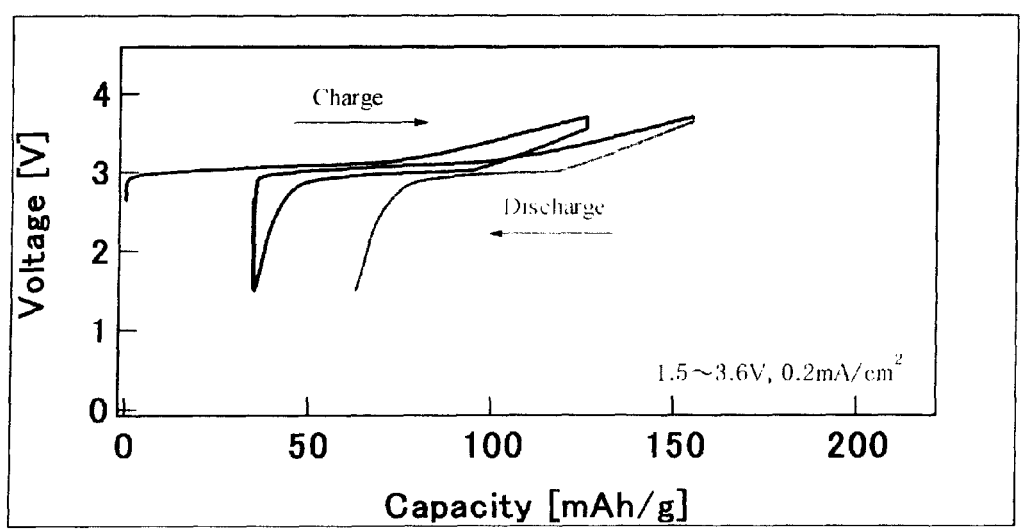
FIG. 2 shows charge and discharge curves in Example 1.
Figure 3:
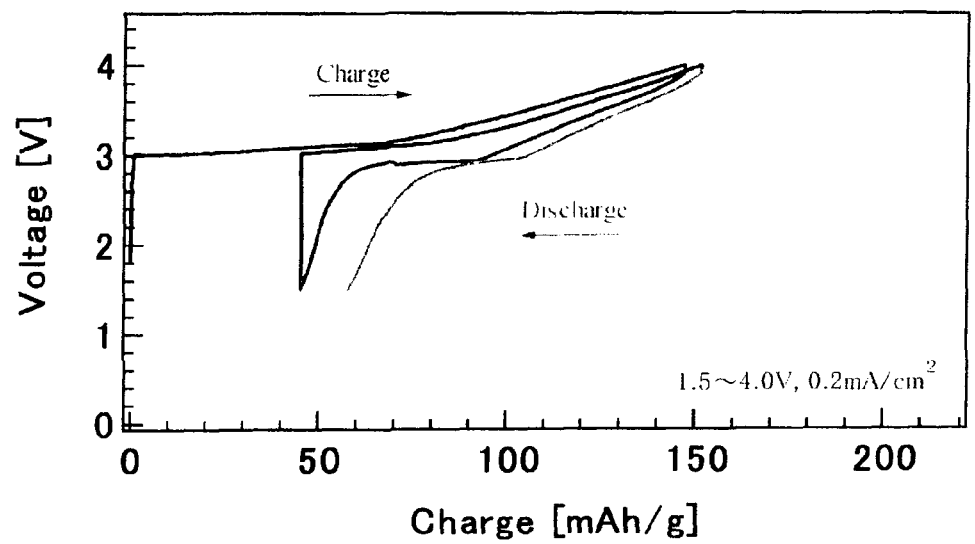
FIG. 3 shows charge and discharge curves in Example 2.
Figure 4:
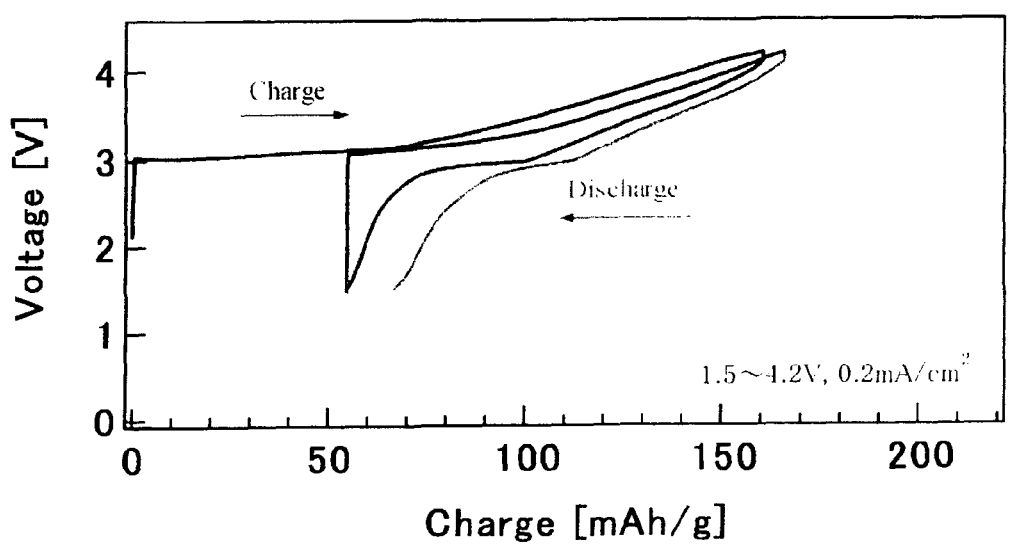
FIG. 4 shows charge and discharge curves in Example 3.
Figure 5:
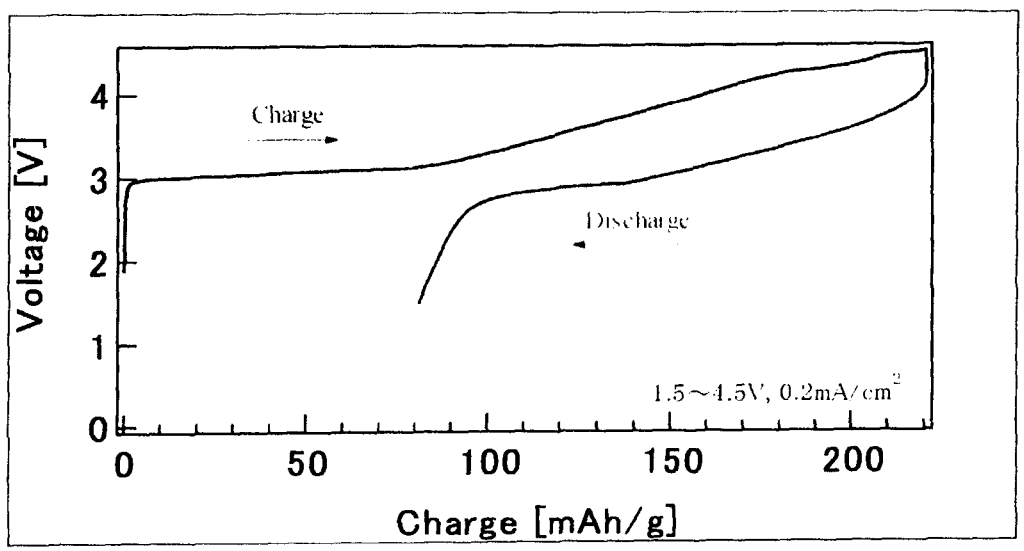
FIG. 5 shows a charge and discharge curve in Example 4.
Figure 6:
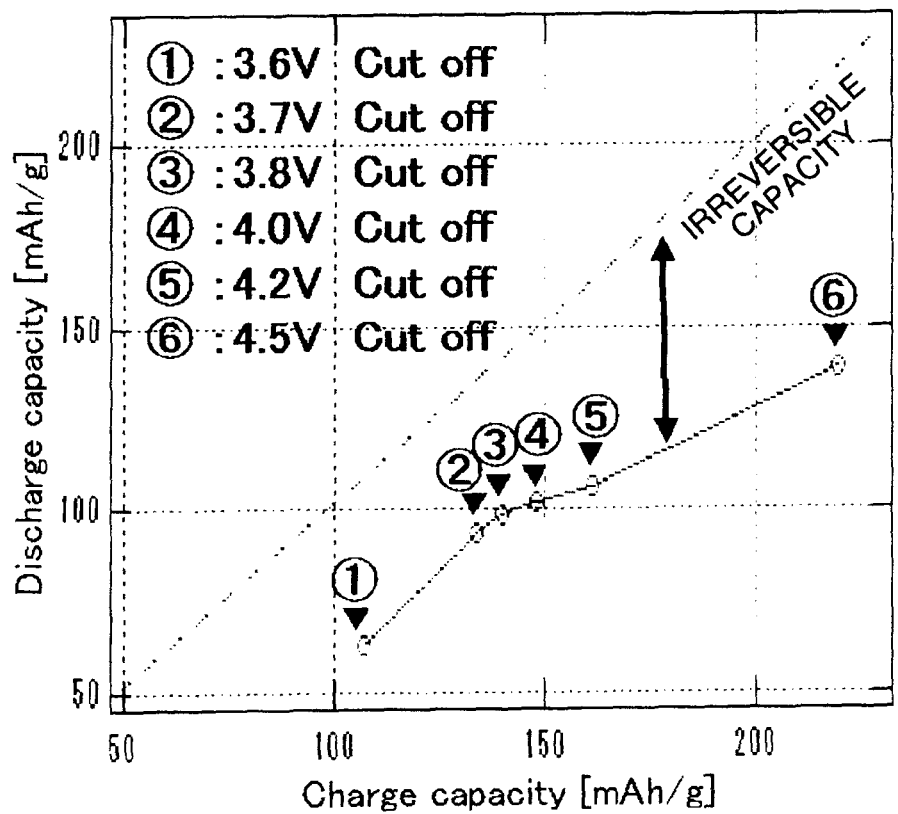
FIG. 6 shows relationship between the initial charge capacity and the initial discharge capacity in Example 4.
Figure 7:
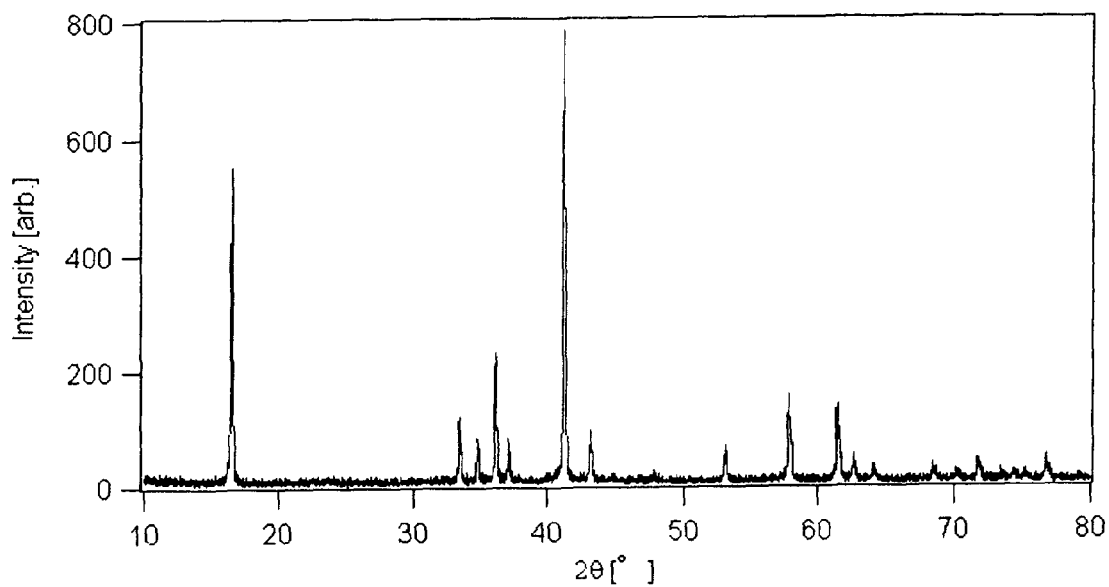
FIG. 7 shows the results of measurement of powder X-ray diffraction in Example 5.
Figure 8:
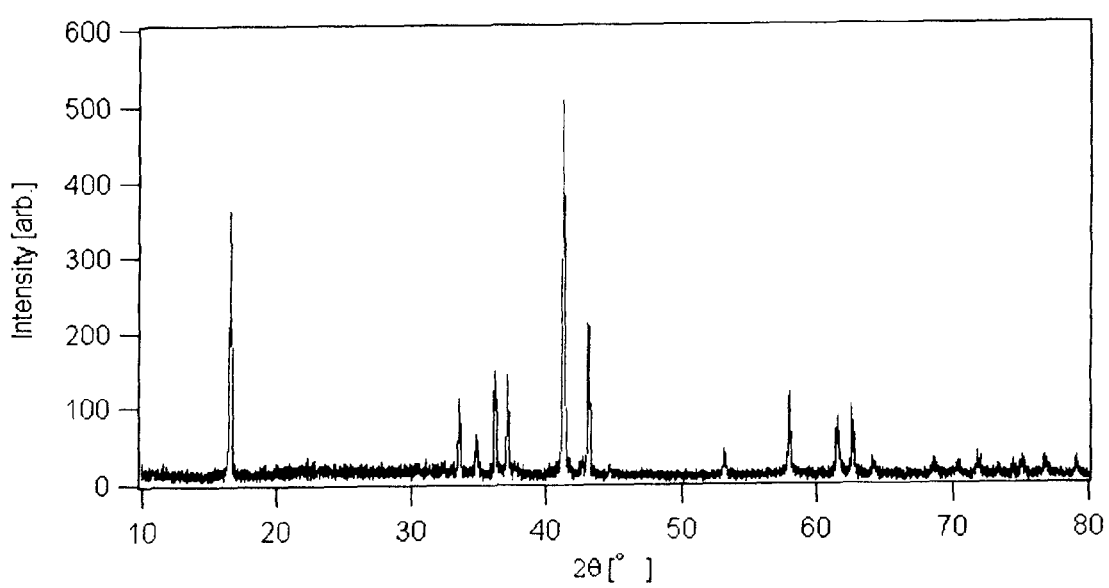
FIG. 8 shows the results of measurement of powder X-ray diffraction in Example 6.
Figure 9:
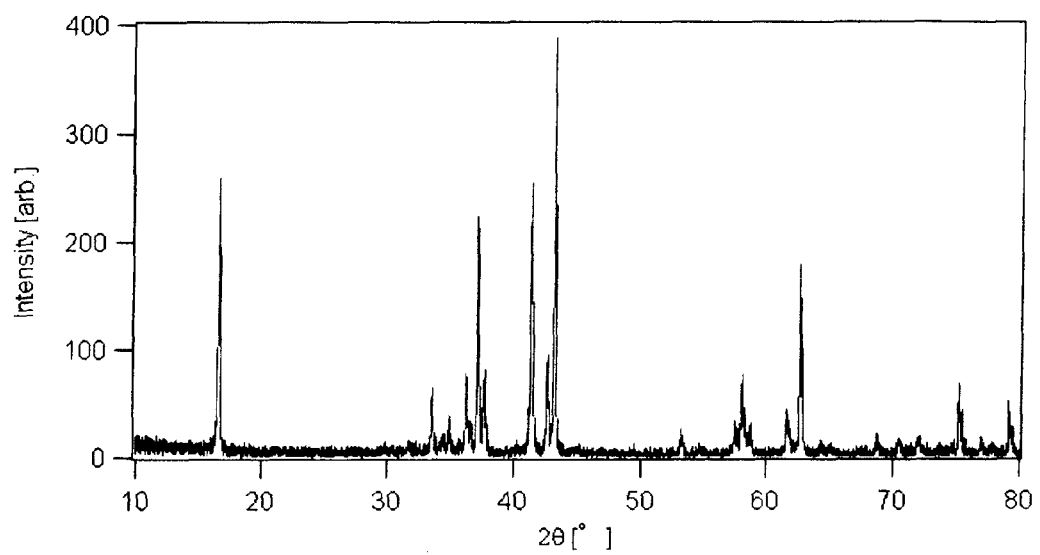
FIG. 9 shows the results of measurement of powder X-ray diffraction in Example 7.

The invention claimed is:

1. A positive electrode active material for non-aqueous electrolyte secondary battery wherein the positive electrode active material comprises a composite oxide containing mainly sodium, nickel, and a tetravalent metal, and having a hexagonal crystal structure, and wherein the composite oxide is represented by $Na[Na_{(1/3-2x/3)}Ni_{(x-y)}M_{(2/3-x/3-y)}A_{2y}]O_2$ wherein M represents one or more tetravalent metals, A represents one or more trivalent metals, $0<x\leq0.5$, $0\leq y<1/6$, and $x>y$.

2. The positive electrode active material for non-aqueous electrolyte secondary battery according to claim 1 wherein in X-ray diffraction analysis of the composite oxide, the value obtained by dividing the XRD peak intensity of an interplanar spacing of 2.20 Å by the XRD peak intensity of an interplanar spacing of 5.36 Å is 1.3 or more and 5.0 or less.

3. The positive electrode active material for non-aqueous electrolyte secondary battery according to claim 1, wherein in X-ray diffraction analysis of the composite oxide, the value obtained by dividing the XRD peak intensity of an interplanar spacing of 2.09 Å by the XRD peak intensity of an interplanar spacing of 2.20 Å is 1 or less.

4. The positive electrode active material for non-aqueous electrolyte secondary battery according to claim 1, wherein M is one or more metals selected from the group consisting of Si, Pb, Zr, Hf, V, Nb, Ta, Re, Ge, Er, Ti, Mn, Sn, Ce, Pr and Tb.

5. The positive electrode active material for non-aqueous electrolyte secondary battery according to claim 1, wherein A is one or more metals selected from the group consisting of Al, Ga, In, Tl, Co, Rh, Sc, V, Cr, Fe, Y, Nb, Mo, Ru, Sb, La, Ce, Pr, Nd, Sm, Eu, Gd, Tb, Dy, Ho, Er, Tm, Yb, Lu, Ta, Re, Os, Ir, Au, Bi, Ac and Np.

6. The positive electrode active material for non-aqueous electrolyte secondary battery according to claim 1, wherein M is one or more metals selected from the group consisting of Si, Pb, Zr, Hf, V, Nb, Ta, Re, Ge, Er, Ti, Mn, Sn, Ce, Pr and Tb; and wherein A is one or more metals selected from the group consisting of Al, Ga, In, Tl, Co, Rh, Sc, V, Cr, Fe, Y, Nb, Mo, Ru, Sb, La, Ce, Pr, Nd, Sm, Eu, Gd, Tb, Dy, Ho, Er, Tm, Yb, Lu, Ta, Re, Os, Ir, Au, Bi, Ac and Np.

7. The positive electrode active material for non-aqueous electrolyte secondary battery according to claim 6, wherein A is one or more metals selected from the group consisting of Al, Ga, Co, V, Y and La.

8. The positive electrode active material for non-aqueous electrolyte secondary battery according to claim 6, wherein M is one or more metals selected from the group consisting of Ti, Mn and Sn.

9. The positive electrode active material for non-aqueous electrolyte secondary battery according to claim 1, wherein M is one or more metals selected from the group consisting of Ti, Mn and Sn; and wherein A is one or more metals selected from the group consisting of Al, Ga, Co, V, Y and La.

* * * * *